June 7, 1927. 1,631,799
E. O. DORSEY
SANITARY POULTRY ROOST
Filed Feb. 6, 1926
Fig. 1.
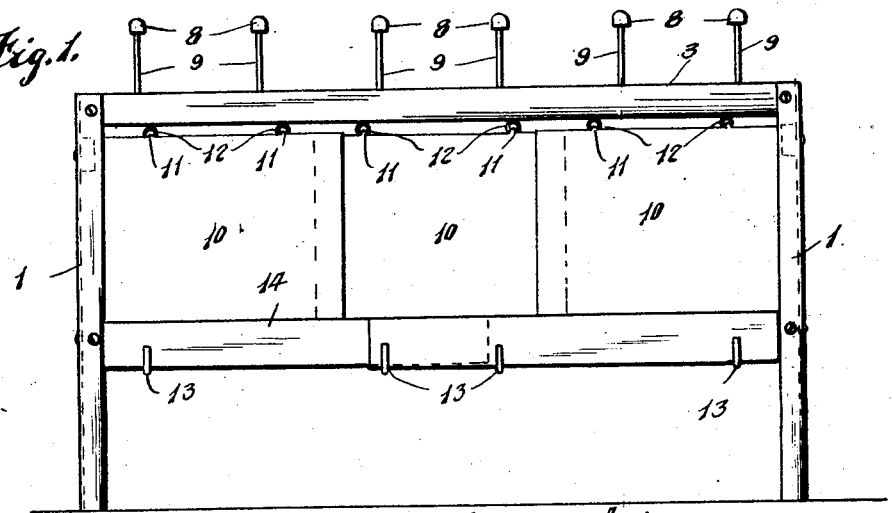
Fig. 2.
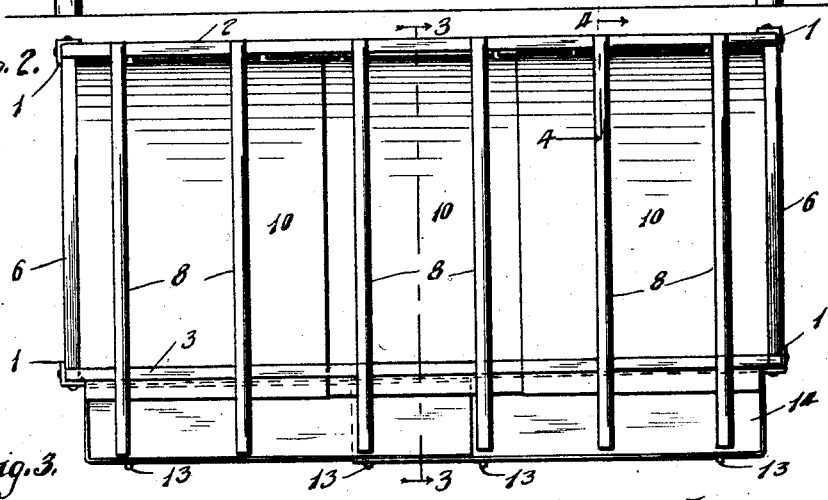
Fig. 3.
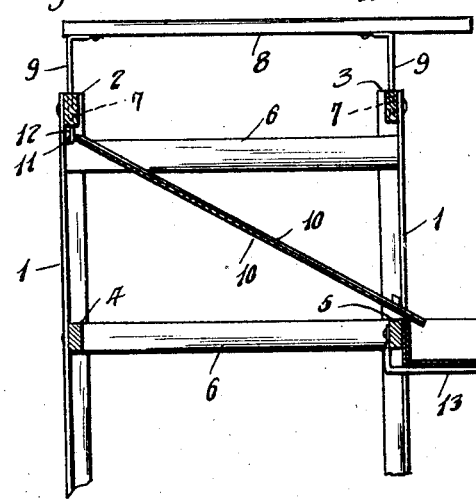
Fig. 4.
Inventor
E. O. Dorsey.
By
Attorney Patented June 7, 1927.

1,631,799

UNITED STATES PATENT OFFICE.

EDGAR O. DORSEY, OF MONTPELIER, INDIANA.

SANITARY POULTRY ROOST.

Application filed February 6, 1926. Serial No. 86,499.

The invention relates to roosts for poultry and has for its object the provision of a roost including a frame adapted to be arranged inside of the poultry house and spaced from the walls thereof, said frame being made preferably of metal to eliminate hiding places for poultry vermin, the roosting bars being removably supported by the frame and inclined plates are also provided and removably mounted on the frame to catch the droppings of the roosting poultry, a trough being also provided at the lower edge of the inclined droppings plate to receive the droppings.

The invention will be described in detail hereinafter and will be found illustrated in the accompanying drawings, in which Figure 1 is a front view in elevation of the improved poultry roost, Figure 2, a top plan view, Figure 3, a transverse sectional view on a plane indicated by the line 3—3 of Figure 2, and Figure 4, a detail sectional view on a plane indicated by the line 4—4 of Figure 2.

In the drawings similar reference characters will be used to designate corresponding parts throughout the several views.

The improved poultry roost includes a frame having the upright legs 1, upper horizontal bars 2 and 3, and lower horizontal bars 4 and 5, said horizontal bars comprising the side members of the frame, while end horizontal bars 6 are provided to space the upper and lower bars hereinbefore described apart.

The upper horizontal bars 2 and 3 are provided with openings 7 in their upper sides in spaced relation, the openings in the two bars being preferably alined with one another. Roost bars 8 are preferably made of wood and have metal legs 9 adapted to engage in openings 7 to support the roost bars on the frame, and to permit removal of the roost bars and legs for cleaning the bars.

The roost also provides means for taking care of the droppings from the roosting poultry, said means comprising a droppings plate, preferably made in separable sections, said sections being designated 10 and being adapted to overlap as shown, said sections being preferably made of sheet metal and provided with hooks 11 on one of their edges to engage in loops 12 on the under side of horizontal bars 2, the opposite edges of said sections being supported by the sections resting on the lower horizontal bar 5, thus providing an inclined plate as shown. Secured to the lower horizontal bar 5, and extending outwardly of the frame, are brackets 13 that are adapted to support a trough 14 under the lower edges of the plate 10 to catch the droppings from said sections, said trough and plate being removable for cleansing.

It will be apparent that by use of the improved poultry roost above described that the roost may be at all times kept in a thoroughly sanitary condition, the construction of the frame of metal eliminating hiding places for "mites" and other insect vermin, and as all of the parts may be thoroughly washed and cleaned the use of the roost will keep poultry in a healthful condition.

What is claimed is:—

1. A poultry roost, comprising a portable frame including upper and lower horizontal bars on its front and back sides, the upper bars supporting roost bars arranged transversely of the frame, one of said upper bars having loops secured to its under side, a droppings plate, hooks secured to one edge of said plate and removably engaging said loops, the opposite edge of said plate supported by the lower horizontal bar on the opposite side of the frame, brackets secured to the last mentioned lower horizontal bar and extending outwardly of the frame, and a trough supported on said brackets under the lower edge of the droppings plate.

2. A poultry roost, comprising an all metal portable frame including upper and lower horizontal bars on its front and back sides, the upper bars provided with spaced openings, roost bars, legs on said roost bars removably engaging in said openings and extending transversely of the frame, one of said upper horizontal bars having loops on its under side, a droppings plate, hooks secured to one edge of said plate and removably engaging said loops, the opposite edge of said plate supported by the lower horizontal bar on the opposite side of the frame, brackets secured to the last mentioned lower horizontal bar and extending outwardly of the frame, and a trough supported on said brackets under the lower edge of the droppings plate.

3. A poultry roost comprising a portable frame including legs; upper and lower horizontal bars secured to said legs on the front and back sides of the frame, roost bars supported on the upper horizontal bars and extending transversely of the frame, loops secured to the upper bar at the back of the frame, a droppings plate, hooks on said droppings plate and removably engaging said loops, the opposite edge of said plate supported by the lower horizontal bar on the front of the frame, brackets engaging the last mentioned bar, and a trough supported on said brackets under the lower edge of the droppings plate.

In testimony whereof I affix my signature.

EDGAR O. DORSEY.